F. HECKMAN.
TRACTION ENGINE.
APPLICATION FILED FEB. 10, 1912.
1,097,429.
Patented May 19, 1914.
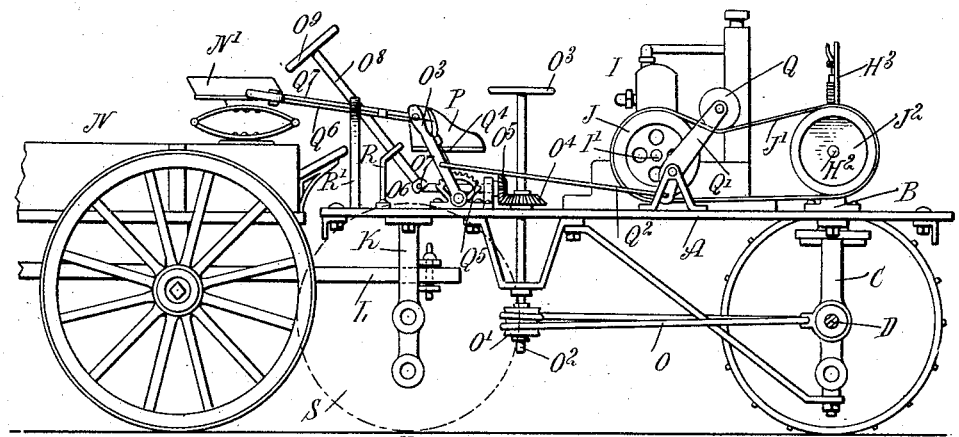
Fig. 1.
Fig. 2.
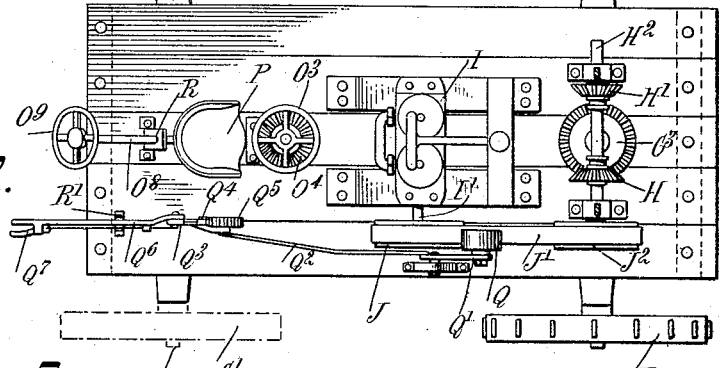
Fig. 3.
Fig. 4.
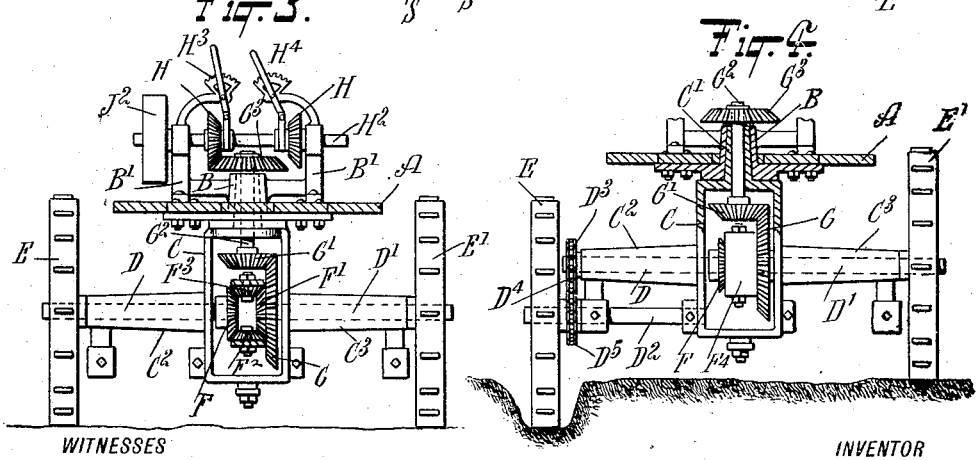
WITNESSES
George Bamlay.
INVENTOR
Fred Heckman
BY Munn & Co
ATTORNEYS

UNITED STATES PATENT OFFICE.

FRED HECKMAN, OF MARIA STEIN, OHIO.

TRACTION-ENGINE.

1,097,429.  Specification of Letters Patent.  Patented May 19, 1914.

Application filed February 10, 1912. Serial No. 676,706.

*To all whom it may concern:*

Be it known that I, FRED HECKMAN, a citizen of the United States, and a resident of Maria Stein, in the county of Mercer and State of Ohio, have invented a new and Improved Traction-Engine, of which the following is a full, clear, and exact description.

The object of the invention is to provide a new and improved traction engine, more especially designed for use on farms for hauling wagons or for drawing plows, pulverizers, seeders, mowers, harvesters and other farm machinery over the fields, and arranged to enable the operator to conveniently handle the traction engine and to permit of making short turns. For the purpose mentioned use is made of a platform supporting a motor, a divided axle, traction wheels rotating with the said divided axle, an axle frame pivoted on the platform and carrying the divided axle, and differential gearing connected with the said divided axle and mounted on the said axle frame, and a driving gear for driving the said differential gearing from the said motor.

A practical embodiment of the invention is represented in the accompanying drawings forming a part of this specification, in which similar characters of reference indicate corresponding parts in all the views.

Figure 1 is a side elevation of the traction engine as attached to a farm wagon, one of the traction wheels being removed; Fig. 2 is a plan view of the traction engine with the shifting mechanisms for the reversing gear omitted; Fig. 3 is a front end elevation of the traction engine, parts being in section; and Fig. 4 is a similar view of the same and showing the traction wheels arranged in different horizontal planes for plowing purposes.

On the front end of a suitably constructed platform A is arranged a bearing B in which is journaled the vertical pivot C' of an axle frame C provided with bearings $C^2$, $C^3$ in which are journaled the sections D, D' of a divided axle carrying the traction wheels E and E'. On the inner ends of the sections D and D' of the divided axle are secured bevel gear wheels F, F' in mesh with pinions $F^2$, $F^3$ journaled on a frame $F^4$ to permit of turning the sections D, D' one faster than the other when turning the traction engine around a corner. On the bevel gear wheel F' is secured a large bevel gear wheel G in mesh at the top with a bevel gear wheel G' secured on the lower end of a vertically-disposed shaft $G^2$ extending centrally through the pivot C' and journaled therein, and on the upper end of the shaft $G^2$ is secured a bevel gear wheel $G^3$ adapted to be engaged at opposite sides by bevel gear wheels H and H' mounted to turn with and to slide on a transverse shaft $H^2$ journaled in suitable bearings B' attached to or forming part of the bearing B. The bevel gear wheels H and H' are engaged by shifting devices $H^3$, $H^4$, of any approved construction, to permit the operator to shift the said gear wheels H and H' on the shaft $H^2$ with a view to move either bevel gear wheel H, H' into mesh with the bevel gear wheel $G^3$. Thus when the bevel gear wheel H is in mesh with the bevel gear wheel $G^3$ and the shaft $H^2$ is rotated in a forward direction then a rotary motion is transmitted to the shaft $G^2$ which by the gear wheels G', G causes a driving of the differential gearing formed of the gear wheels F, F', $F^2$ and $F^3$, whereby the sections D, D' of the divided axle are driven and with the said sections the traction wheels E, E' to propel the traction engine in a forward direction. When the bevel gear wheel H is moved out of mesh with the bevel gear wheel $G^3$ and the bevel gear wheel H' is moved in mesh with the said bevel gear wheel $G^3$ and the shaft $H^2$ is rotated in a forward direction, then a reverse turning movement is given to the traction wheels E, E' to move the traction engine backward.

A motor I of any approved construction, preferably an internal combustion engine, is mounted on the platform A and on the shaft I' of the motor I is secured a pulley J connected by a belt J' with a pulley $J^2$ secured on the shaft $H^2$ previously mentioned, so that when the motor I is running a rotary motion in a forward direction is given to the shaft $H^2$ for driving the traction wheels E, E' as above explained. Other transmission mechanism may be employed.

The platform A is provided at its rear end with a depending bracket K adapted to be connected by a coupling L with the forward end of a farm wagon N, of any approved construction, and provided with a seat N'. Now when the traction engine is drawn forward the farm wagon N is carried along by the traction engine.

In order to steer the traction engine the following arrangement is made: A rope or cable O is connected at its ends to the bearings $C^2$, $C^3$, and the said rope or cable winds on a pulley $O'$ held on the lower end of a steering shaft $O^2$ journaled in suitable bearings on the platform A, and provided at its upper end with a hand wheel $O^3$ under the control of the operator seated on a seat P mounted on the platform A. Thus by the operator turning the hand wheel $O^3$ in one direction the divided axle is swung in a horizontal direction to cause the traction wheels E and $E'$ to travel to one side, and when the hand wheel $O^3$ is turned in the opposite direction the traction engine is steered to the opposite side. On the steering shaft $O^2$ is secured a bevel gear wheel $O^4$ in mesh with a bevel gear wheel $O^5$ secured on a shaft $O^6$ extending longitudinally and journaled on the platform A. The rear end of the shaft $O^6$ is connected by a universal joint $O^7$ with an auxiliary steering shaft $O^8$ carrying a hand wheel $O^9$ under the control of the operator when the latter is seated on the seat $N'$. Thus when turning the hand wheel $O^9$ a rotary motion is given to the steering shaft $O^2$ to turn the traction engine either to the right or to the left according to the direction in which the hand wheel $O^9$ is turned.

In order to insure proper transmission of power from the motor I to the shaft $H^2$ use is made of a belt tightening pulley Q engaging the upper run of the belt $J'$. The pulley Q is journaled on a tightening lever $Q'$ fulcrumed on the platform A and connected by a link $Q^2$ with a hand lever $Q^3$ under the control of the operator when seated in the seat P. The hand lever $Q^3$ is provided with a locking lever $Q^4$ adapted to engage a notched segment $Q^5$ fixed on the platform A. Thus by the operator manipulating the hand lever $Q^3$ the tightening pulley Q can be moved in contact with the belt $J'$ with a view to insure a proper transmission of the power from the motor I to the shaft $H^2$.

In order to enable the operator when seated on the seat $N'$ to control the tightening pulley Q the following arrangement is made: The hand lever $Q^3$ is connected with a hand lever $Q^6$ extending rearwardly to within convenient reach of the operator seated on the seat $N'$, and the hand lever $Q^6$ is provided with a lever and link connection $Q^7$ connected with the locking lever $Q^4$, so that the operator seated on the seat $N'$ can actuate the lever $Q^3$ in the same manner as above described, with the operator seated on the seat P. The auxiliary steering shaft $O^8$ is journaled in a suitable bearing R carried by the platform A, and the supplementary lever $Q^6$ is guided on a guide $R'$ erected on the platform A.

When the traction engine is used for plowing it is desirable that one of the traction wheels E, $E'$ travel in the bottom of the furrow while the other traction wheel travels on the land, and in order to make the necessary compensation use is made of a supplementary axle $D^2$ (see Fig. 4) secured to the axle frame C and adapted to carry the traction wheel E or $E'$ removed for the time being from the corresponding section D or $D'$ of the divided axle. On the section D or $D'$ from which its traction wheel E or $E'$ has been removed is secured a sprocket wheel $D^3$ connected by a sprocket chain $D^4$ with a sprocket wheel $D^5$ secured to the hub of the traction wheel E or $E'$ so that the rotary motion given to the corresponding section of the divided axle is transmitted by the sprocket wheels $D^3$, $D^5$ and the sprocket chain $D^4$ to the corresponding traction wheel E or $E'$. The axle $D^2$ is located a distance below the divided axle so that the traction wheels E and $E'$ travel on different levels, that is, one in the bottom of the furrow and the other on the land, as will be readily understood by reference to Fig. 4.

It is understood that the axle $D^2$ can be attached to the axle frame C either on the right or left hand side thereof for supporting the corresponding traction wheel E or $E'$.

If desired, the bracket Q may be used for supporting a supplementary rear axle S carrying rear wheels $S'$ to support the rear end of the platform A if the latter is not coupled to a farm wagon N or similar machine or the like. In this case the traction engine can be used wholly independently of the wagon and the farm vehicle to be propelled can be attached to the rear end of the platform A in any suitable manner.

Having thus described my invention, I claim as new and desire to secure by Letters Patent:

1. In a traction engine, a platform to the rear end of which a vehicle is adapted to be secured, said platform being provided with a seat, a pivoted axle carrying frame, traction wheels, a steering shaft on the platform adjacent the seat, means operatively connecting the steering shaft with the axle frame, a longitudinal shaft mounted on the platform and having its front end geared with the steering shaft, and an auxiliary steering shaft operatively connected with the rear end of the longitudinal shaft, said auxiliary steering shaft extending rearwardly beyond the rear end of the platform.

2. In a traction engine, a platform to the rear end of which a vehicle is adapted to be secured, said platform being provided with a seat, a pivoted axle carrying frame, traction wheels, a steering shaft on the platform adjacent the seat and having a pulley at its lower end, a cable winding on said pulley and having its ends connected to the axle frame, a longitudinal shaft on the platform, gearing between the front end of said shaft and the steering shaft, and an auxiliary steering shaft connected by a universal joint with the rear end of the longitudinal shaft, said auxiliary steering shaft extending rearwardly beyond the rear end of the platform.

3. In a traction engine, a platform to the rear end of which a vehicle is adapted to be secured, a pivoted axle carrying frame, traction wheels, a motor, means for operating the traction wheels from the motor, means for controlling the operating means, a hand lever connected with the controlling means, a second hand lever connected with the first hand lever and extending rearwardly beyond the rear end of the platform, a steering shaft, means for operating the axle frame from said shaft, a longitudinal shaft geared with the steering shaft, and a second steering shaft operatively connected with the longitudinal shaft, said second steering shaft extending rearwardly beyond the rear end of the platform.

4. The combination with a vehicle having a seat, a platform to the rear end of which the vehicle is secured, the platform being provided with a seat, a motor on the platform, a pivoted axle frame mounted in the platform, axles in the frame, traction wheels on the axles, gearing for operating the traction wheels from the motor, an operating lever on the platform adjacent the seat thereof, means for controlling the operating mechanism from said lever, a second operating lever on the platform and extending to the seat of the vehicle, said lever being connected with the first-named lever, a steering shaft mounted on the platform adjacent to the platform seat, means operatively connecting the steering shaft with the axle frame, a second steering shaft mounted on the platform and extending adjacent to the vehicle seat, and means for operating the first steering shaft from the second shaft.

In testimony whereof I have signed my name to this specification in the presence of two subscribing witnesses.

FRED HECKMAN.

Witnesses:
FRED J. GOETTEMOELLER,
V. F. LOCHTFRED.